Nov. 1, 1960 E. A. YERMAN ET AL 2,958,153
FISHING TACKLE
Filed Jan. 7, 1959 3 Sheets-Sheet 1
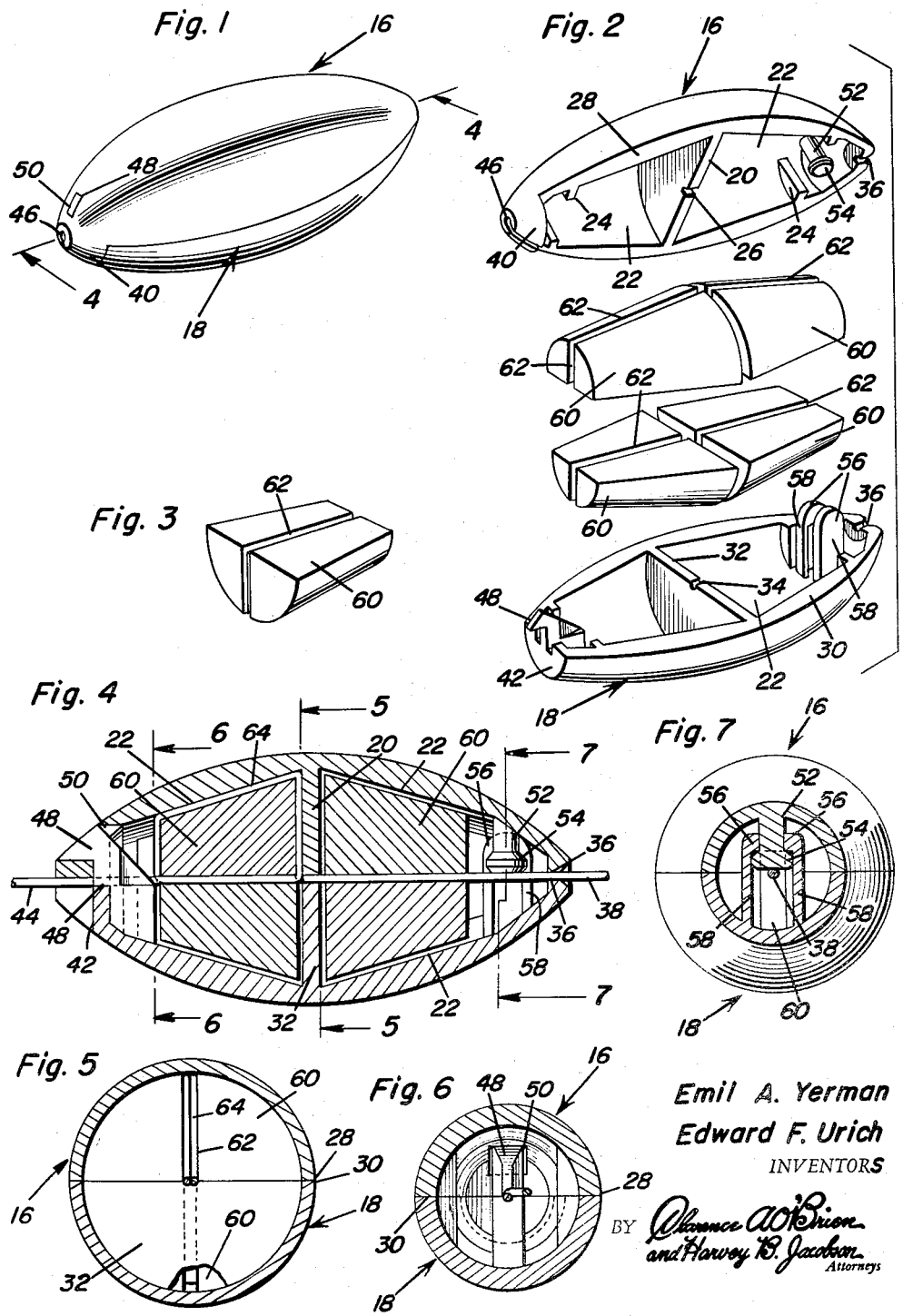
Emil A. Yerman
Edward F. Urich
INVENTORS

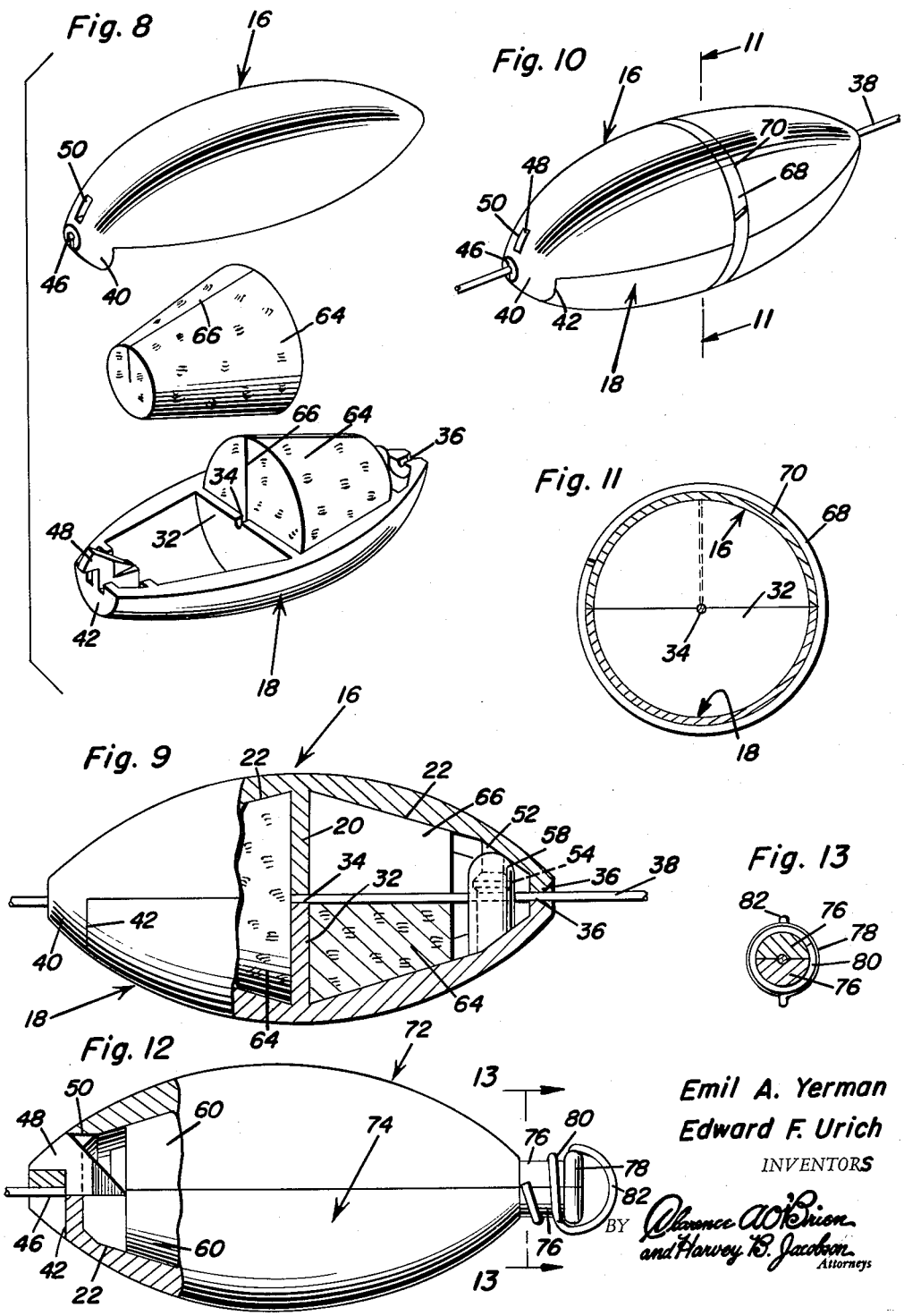

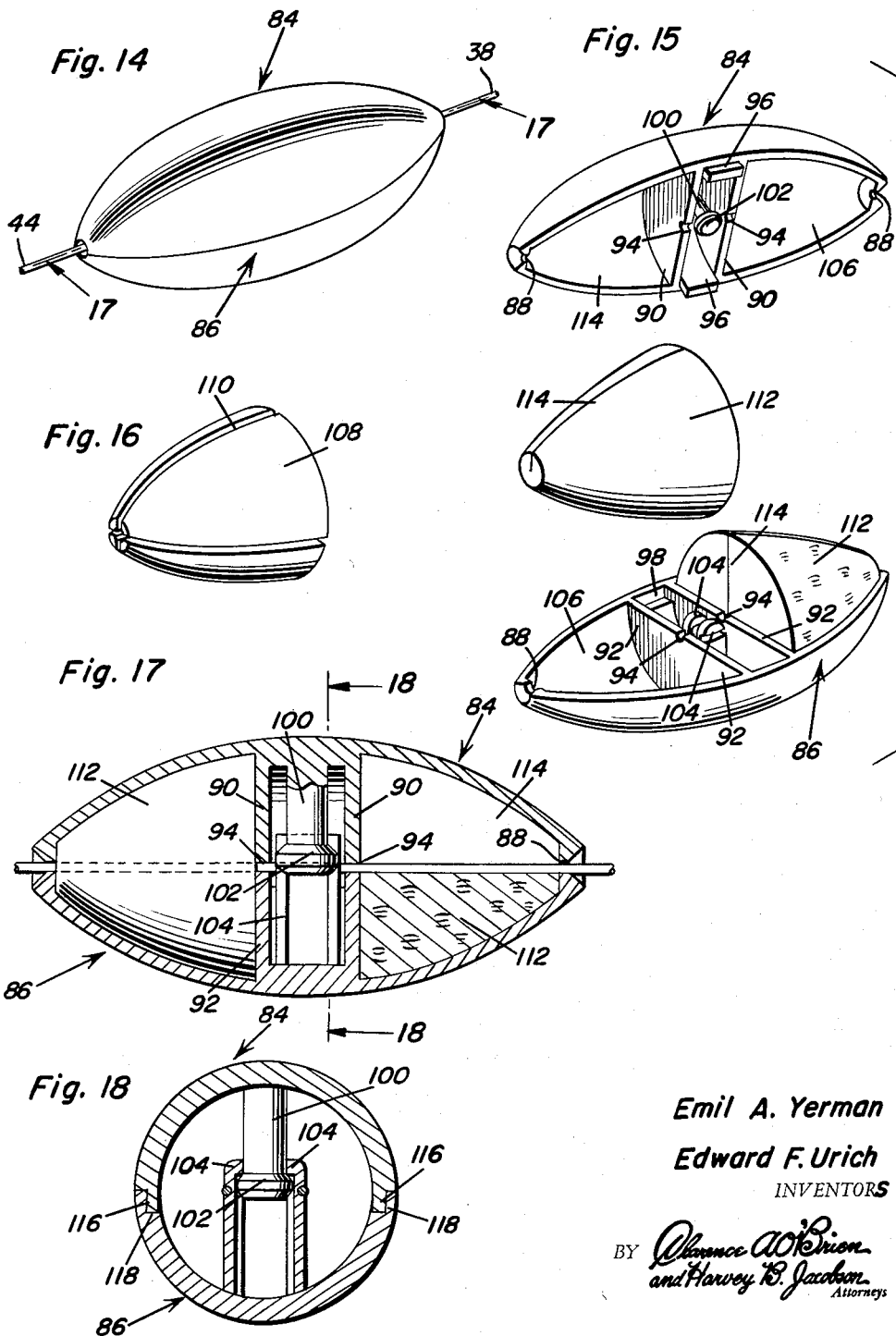

United States Patent Office 2,958,153
Patented Nov. 1, 1960

2,958,153

FISHING TACKLE

Emil A. Yerman, 350 SW. 30th Ave., Fort Lauderdale, Fla., and Edward F. Urich, 1100 SE. 12th Terrace, Deerfield Beach, Fla.

Filed Jan. 7, 1959, Ser. No. 785,472

6 Claims. (Cl. 43—43.14)

The present invention relates, broadly classified, to fishing tackle but, more specifically, to line attached devices which are classified as floats and bobbers on the one hand, and sinkers on the other hand.

As the opening statement of the subject matter of the invention reveals there are many and varied styles and forms of sinkers which are readily attachable to and detachable from a fishing line. By the same token floats have been constructed one way or another, in fact various ways, to enable a fisherman to apply and remove the same with expediency. An object of the instant invention is to provide a sectional body the sections of which are readily separable and connectible and which are, what is more important, such that they cooperate in defining a chamber which is adapted to contain either weight means or relatively buoyant means providing a device which is convertible from a float to a sinker and vice versa.

Another object of the invention is to provide a line attached device of the type described of variable weight or heaviness and which may be loaded with variable weight media to serve as a sinker or unloaded to serve as a float, the same being compact and convenient in construction and such that it can be fastened to a line without using special tools, without requiring the tying of knots or providing special stop shoulders or abutments and which can be utilized while the line remains continuous and to, in this manner, allow for the use of two or more sinkers or floats, as may be desired, without disrupting a continuous line.

Briefly and generically novelty is predicated on the combination of a fishing line, means which is adapted to regulate the depth which the line sinks into water relative to the plane of the bottom or bed of the water. The means comprises a line attached device as described which is preferably characterized by a hollow shell constructed of half-sections which half-sections are separably clamped together in face-to-face relationship. A portion of the line passes lengthwise through the body between the mating surfaces of the half-sections. Media such as weights, cork, or the like is arranged removably within pocket-like portions in the body. The media or material employed is to be of a predetermined character to regulate the positive and negative buoyancy properties of the body depending on the loading of the same whereby said body may be caused to serve in the capacity of a float or sinker as the case may be.

Other objects, features and advantages will become more readily apparent from the following description and the accompanying illustrative, but not restrictive, drawings.

In the drawings, wherein like numerals are employed to designate like parts throughout the same:

Fig. 1 is a perspective view of a line attached device constructed in accordance with the principles of the present invention, the line being omitted.

Fig. 2 is an exploded perspective view wherein all of the essential components are suitably disclosed.

Fig. 3 is a perspective view of one of the insertable and removable weights also sometimes referred to as a shell loading insert or equivalent means.

Fig. 4 is a section on the longitudinal line 4—4 of Fig. 1 with the parts drawn on a larger scale and with parts in elevation and also with the fishing line attached.

Figs. 5, 6 and 7 are cross-sections on the lines 5—5, 6—6 and 7—7, respectively, of Fig. 4.

Fig. 8 is an exploded perspective view showing a slightly modified construction.

Fig. 9 is a view on a larger scale with parts in section and elevation and with the parts assembled to provide the complete float.

Fig. 10 is a further modification or form of the invention wherein a split metal band fitting into a groove or channel is utilized.

Fig. 11 is a cross-section on a slightly enlarged scale taken on the plane of the line 11—11 of Fig. 10.

Fig. 12 is a view in side elevation with one end portion broken away and wherein additional means is shown at the right to assist in connecting the right hand end portions of the half-sections together.

Fig. 13 is a section on the plane of the line 13—13 of Fig. 12.

Fig. 14 is a perspective view of a further modification.

Fig. 15 is an exploded perspective view showing the precise construction of the component parts in the modification now under consideration.

Fig. 16 is a perspective view of an optionally usable insert.

Fig. 17 is a view with parts in section and elevation taken on the plane of the line 17—17 of Fig. 14, and Fig. 18 is a cross section on the line 18—18 of Fig. 17.

Reference is to be made first to Figs. 1 to 9, inclusive, wherein the elongated ellipsoidal body is structurally the same. More specifically the "body" comprises a hollow shell made up of a pair of similarly constructed and performing semi-ellipsoidal sections or half-sections 16 and 18, respectively. As seen in Fig. 2 the "top" half-section 16 is interiorly provided with a transverse divider or partition 20 separating the hollow portion into separate chambers or compartments 22. Incidentally, the sections may be of any suitable plastic or equivalent material and if desired may have internal reinforcing ribs 24. The straight across edge of the partition has a central notch 26 and this edge is flush with the marginal edges 28 which circumscribe the mouth or open side of the half-section. These surfaces 28 mate with and rest firmly against similar encompassing surfaces 30 at the open or mouth side of the bottom half-section 18. Here again this half-section has a partition 32 registering with the partition 20 and having a notch 34 therein. These notches 26 and 34 register with suitable complemental notches 36 in the rear end portions of the sections to accommodate a portion of the fishing line, the portion 38 (Fig. 4) which passes through the rear end of the shell to allow for the attachment thereto of fishhooks, lures and so on. The forward end of the half-section 16 has a suitable nose 40 which rests against and overhangs the abutment or flat forward end portion 42 on the bottom section 18. The nose is bifurcated and the furcations allow for passage therethrough of the cooperating portion 44 (Fig. 4) of the fishing line. There is also an axial hole or opening 46 in the nose to better arrange the fishing line. The forward portion of the setcion 18 has an upstanding hook-like detent or catch 48 which engages releasably in a keeper slot or opening 50 provided therefor in the nose in the manner shown for example in Figs. 1 and 4. Whereas the forward end portions of the half-sections are thus hooked or latched together a slightly different means is provided for separably connecting the rear end portions, said means comprising a stud 52 with a head 54 which is engageable with the headed ends 56 on the retaining fingers 58. These components collectively considered provide interlocking snap fastener means.

It will be evident that the compartments or pockets of the hollow half-sections may be loaded or charged with insertable and removable media. The expression "media" is employed here to cover varying kinds of inserts or material that might be broadly construed as insertable and removable "filler" means. The fact is that the insertable means may be broadly described on the one hand as weights and alternatively described in an opposite manner as buoyant material. For sake of illustration the block-like inserts or members denoted at 60 are lead weights. They are shaped to fit in their respective pockets. The surface portions are provided with alined grooves 62 which grooves may be employed so that the portion 64 (Fig. 4) of the fishing line may be wrapped and thus releasably tied around the grooved portion of at least one of the inserts or weights. Then the remaining portion of the line from left to right in Fig. 4 passes through the notches 26 and 34 and then through grooves 62 and finally through the notches to accommodate the portion 38 of the line. The space between the bendably resilient retaining fingers 58 allows for free passage of the line in the manner illustrated. That which is is disclosed in Figs. 4 and 5 and Fig. 4 in particular constitutes a readily applicable and removable line sinker.

The sectional body or shell seen in Figs. 8 and 9 is the same as that already described. Therefore the same reference numerals are employed to designate like parts. The fact is that really the only difference in Figs. 8 and 9 is the fact that instead of using "weights" 60 it is within the purview of the concept to employ means which is less heavy and in fact is light in weight and consequently buoyant. While the inserts here might be of wood, plastic or other suitable buoyant materials we have found it advisable to use simple truncated conical corks or floats 64. The float is provided longitudinally with a slit 66 which serves to frictionally grip the line and permits the line to be passed therethrough and at the same time fastened frictionally by the pliant properties of the cork in the manner illustrated in Fig. 9. Thus a sectional shell or body which is readily applicable and removable and wherein the sections are hollow to be loaded has been covered and serves the intended convertible purposes of the invention in providing a float on the one hand or a sinker on the other hand.

With reference now to the slight deviation seen in Figs. 10 and 11 it is believed that the body and half-sections may be identified with the same reference numerals already employed. In this arrangement it can be assumed that the fingers 58 with their detents 56 and the headed shank 52 may be omitted (not shown) and in lieu thereof the fastening band or ring may be employed. This comprises a split resilient band or ring 68 fitted into cooperating registering grooves 70 formed in the larger diametered or central portion of the half-sections 16 and 18.

In the arrangement or modification appearing in Figs. 12 and 13 it is also within the purview of the invention to load the sectional shell with either weight means or float means. Also the left hand end portions may be hooked together in the manner already described. So, here again it is believed that corresponding parts may be conveniently designated by corresponding reference numerals. However for sake of convenience the upper half-section or shell is here denoted by the numeral 72 and the lower one by the numeral 74. The left hand end portions are the same as already described and therefore the same reference numerals apply. At the right hand end there is a two part stem or extension the parts being upper and lower halves 76 which together with the beaded portions provide a stem with a head 78. This headed stem is encircled by convolutions or coils 80 on a readily attachable and detachable coil spring fastener 82. This part 82 is screwed along the fishing line and then onto the headed shank and in this manner the right hand end portions of the half-sections 72 and 74 are separably joined together.

In the modification seen in Figs. 14–18 the construction is basically the same as already described. However we shall conveniently refer to the upper semi-ellipsoidal half-section (Fig. 15) by the numeral 84 and the lower one by the numeral 86. In this arrangement the forward and rearward nose portions or ends have cooperating notches 88 to accommodate the fishing line seen in Fig. 17. Here the forward and rearward end fasteners are not utilized. In lieu thereof we provide centrally located fastening means. That is to say the upper and lower half-sections have space dividers or partitions 90 at the top and 92 at the bottom said partitions in turn having notched portions 94 which register with each other. The extensions or lugs 96 project into keeper seats 98 provided therefor to assist in lining up the sections. The headed shank or stem is denoted at 100, the head 102 fitting between the detents 104 on the spring retaining fingers located in the space between the partitions 92. Here again the partitions divide the hollow spaces into pockets or compartments 106 for the inserts. The insert 108 in Fig. 16 is, let us assume, a weight having surface grooves 110 for wrapping of the fishing line in the manner already explained. The insert at the right is a truncated conical cork or equivalent float 112 having a radial slit 114 to accommodate and frictionally grip a portion of the fishing line. It is yet to be pointed out as shown in Fig. 18 that the longitudinal edge portions may be provided with tongues 116 (Fig. 18) fitting into grooves 118 thus providing a quick separable tongue and groove joint, between the half sections.

Each shell or half-section contains two cavities defined by a separator. This separator also acts as a reinforcing rib for each shell. It is not necessary that the shells each have two cavities, but may contain either one, or two, or several cavities, depending on the size of sinker or float desirable. Regardless of the size of the shell halves, a complete unit is not limited to one weight only since a certain size shell can be used to hold one or more segments creating a variation of weight or buoyancy desired.

On the male half, one end of the shell incorporates a hook that engages into a keeper slot in the female half while the opposite end employs double retaining fingers that snap over or are engageable with a headed stud in the female shell. While a hook type arrangement on one end provides a squeezing action on the line, the shells may be made with interlocking retaining fingers (and studs) on both ends, or several other methods of locking may be employed. Another type locking device is illustrated on the drawings. This device is a simple wire coil that is "screwed" onto the line and onto an extended end of the two shells securing the entire unit to the line.

The shape or style is not necessarily confined to the one(s) illustrated although it is preferred that the unit be as compact as possible with smooth lines pleasing to the eye. The groove that encircles the median or central portion of the shells serves a functional as well as decorative purpose. It may be used in emergency for a wire, band, line, or other fastening means (not detailed) in the event the regular fastening device shall fail to function. Or, it may be used as a permanent fastening means by placing a ring or band around it.

The lead segments or weights illustrated are half round and tapered with a groove running completely around. This groove allows the line to be recessed when looped around the segment permitting the segment to lay flush and snug in the shell. Since a variation of styles are possible, other shapes than the one illustrated may be used.

When the unit is to be used as a float, tapered corks may be used within the shells to create the necessary buoyancy. Each cork must have a slit half way through to allow the line to pass through the cork, at the same time providing additional squeezing to the line and preventing the float from slipping. In the event that separate cork or other buoyant segments are used, the line may be looped around in the same fashion as with the weighted segments to acquire additional holding on the line.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device adapted to be attached to a fishing line to regulate the descent and depth of the fishing end of the line relative to the bottom of a body of water, said device embodying a hollow body including complemental body sections having cooperating surfaces abutting each other and separably clamped together in face-to-face relationship, a portion of a fishing line being adapted to pass lengthwise through said body and between mating surfaces of said body sections, and media arranged removably within said body, said media being such in substance and character to provide desired positive and negative buoyancy properties in said body, said buoyancy regulating media being changeably variable at will proportional to water displacement needs and such in construction that a cooperating portion of the fishing line may be physically connected thereto in a manner to securely fasten the body on said fishing line, said media comprising a cork having a radial slit in which a portion of the line is wedged and frictionally held.

2. For attachment to a fishing line without requiring the use of tools and which obviates any need for headed or screw-threaded fasteners, a readily applicable and removable hollow body made up of cooperable half-sections between which portions of a fishing line may be passed, readily openable and closable fastening means joining said half-sections together, said half-sections having at least one pocket shaped and adapted to accommodatingly retain a readily applicable and removable insert, said insert being of material predetermined in character and weight, making it possible for one to utilize the body as a float or a sinker as desired, said half sections having a groove encircling the exterior surfaces of the half-sections, and a readily applicable and removable split resilient ring fitted and contained in said groove.

3. For attachment to a fishing line without requiring the use of tools and which obviates any need for headed or screw-threaded fasteners, a readily applicable and removable hollow body made up of cooperable half-sections between which portions of a fishing line may be passed, readily openable and closable fastening means joining said half-sections together, said half-sections having at least one pocket shaped and adapted to accommodatingly retain a readily applicable and removable insert, said insert being of material predetermined in character and weight, making it possible for one to utilize the body as a float or a sinker as desired, said fastening means embodying a headed rigid stem carried by one half-section and fitting removably between detents on springy retaining fingers carried by the other half-section.

4. For attachment to a fishing line without requiring the use of tools and which obviates any need for headed or screw-threaded fasteners, a readily applicable and removable hollow body made up of cooperable half-sections between which portions of a fishing line may be passed, readily openable and closable fastening means joining said half-sections together, said half-sections having at least one pocket shaped and adapted to accommodatingly retain a readily applicable and removable insert, said insert being of material predetermined in character and weight, making it possible for one to utilize the body as a float or a sinker as desired, said fastening means embodying a rigid stem carried by one half-section and having a head thereon fitting removably between detents on springy retaining fingers carried by the other half-section, and further including a hook-shaped catch carried by one half-section and fitting into a keeper slot provided therefor in the other half-section.

5. For attachment to a fishing line without requiring the use of tools and which obviates any need for headed or screw-threaded fasteners, a readily applicable and removable hollow body made up of cooperable half-sections between which portions of a fishing line may be passed, readily openable and closable fastening means joining said half-sections together, said half-sections having at least one pocket shaped and adapted to accommodatingly retain a readily applicable and removable insert, said insert being of material predetermined in character and weight, making it possible for one to utilize the body as a float or a sinker as desired, said fastening means embodying a headed extension carried by like end portions of the respective half-sections and fitting together and held in operative relationship by means of cooperating encircling coils of a readily attachable and detachable coil spring fastener.

6. A device adapted to be attached to a fishing line comprising a hollow elongated ellipsoidal body comprising a hollow shell made up of a pair of similarly constructed and performing semi-ellipsoidal half-sections, more specifically a top half-section interiorly provided with a transverse divider separating the hollow portion into separate compartments, and a bottom half-section also having its hollow portion provided with a transverse partition dividing the hollow portion into separate chambers cooperatively registering with the first-named chambers, confronting surfaces of said half-sections mating and abutting each other, cooperating edge surfaces of the dividers also corresponding and contacting each other and central portions of said partitions having cooperating notches providing a passage for a fishing line, means separably joining the respective half-sections together, said chambers providing pockets for reception and retention of inserts, and inserts fitting into said pockets, said inserts being of material predetermined in character and weight making it possible for one to utilize the shell as a float or a sinker as desired, and said inserts having surface grooves permitting portions of a fishing line to be wrapped around the same.

References Cited in the file of this patent
UNITED STATES PATENTS

| | | |
|---|---|---|
| 2,230,456 | Henze | Feb. 4, 1941 |
| 2,849,827 | Gardiner | Sept. 2, 1958 |